United States Patent [19]
Maine et al.

[11] Patent Number: 5,515,062
[45] Date of Patent: May 7, 1996

[54] LOCATION SYSTEM AND METHOD WITH ACQUISITION OF ACCURATE LOCATION PARAMETERS

[75] Inventors: Kristine P. Maine, Phoenix; Keith A. Olds, Mesa; Stanley W. Attwood, Sun Lakes, all of Ariz.

[73] Assignee: Motorola, Inc., Schaumburg, Ill.

[21] Appl. No.: 105,227

[22] Filed: Aug. 11, 1993

[51] Int. Cl.$^6$ .............................. G01S 3/02; G01S 3/52; H04B 7/185
[52] U.S. Cl. ........................ 342/457; 342/418; 342/352
[58] Field of Search .................................. 342/357, 418, 342/457, 352; 364/449

[56] References Cited

U.S. PATENT DOCUMENTS

| | | | |
|---|---|---|---|
| 3,742,498 | 6/1973 | Dunn | 342/357 |
| 3,769,589 | 10/1973 | Buntschuh et al. | 325/419 |
| 4,278,977 | 7/1981 | Nossen | 343/6.5 |
| 4,445,118 | 4/1984 | Taylor et al. | 343/357 |
| 4,453,165 | 6/1984 | Maine | 342/418 |
| 4,578,678 | 3/1986 | Hurd | 343/357 |
| 4,918,609 | 4/1990 | Yamawaki | 364/449 |
| 5,008,679 | 4/1991 | Effland et al. | 342/353 |
| 5,041,833 | 8/1991 | Weinberg | 342/357 |

OTHER PUBLICATIONS

"Emitter Location Accuracy Using TDOA and Differential Doppler" by Paul C. Chestnut from IEEE Transactions on Aerospace and Electronic Systems, vol. AES-18, No. 2, Mar. 1982.

"Geolocation of Frequency–Hopping Transmitters via Satellite" by A. Sonnenschein and W. K. Hutchinson from Technical Report 900, Nov., 1990.

"Geolocation via Satellite: A Methodology and Error Analysis" by M. J. Shensa from Technical Report 1244, May 1988.

*Primary Examiner*—Gregory C. Issing
*Attorney, Agent, or Firm*—Philip E. Hall; Robert M. Handy; Kevin K. Johanson

[57] ABSTRACT

A location system relies upon a non-coherent, FDM/TDM communication scheme to measure location parameters. A locator unit moves relative to the locatable unit. A series of messages are communicated between the locator unit and the locatable unit. Through feedback provided from the locator unit to the locatable unit, the locatable unit adjusts its reference frequency and time base so that signals it transmits arrive at the locator unit on a desired frequency and at a desired time slot. The locatable unit estimates Doppler and propagation duration and transmits the estimates to the locator unit. The locator unit measures offsets between desired frequencies and time slots and actual frequencies and time slots. The offsets are combined with the locatable unit's estimates of Doppler and propagation duration to form an integrated Doppler parameter and an integrated propagation duration parameter. The integrated Doppler and propagation duration are used to determine location.

26 Claims, 7 Drawing Sheets

LOCATION SYSTEM AND METHOD WITH ACQUISITION OF ACCURATE LOCATION PARAMETERS

CROSS-REFERENCE TO RELATED APPLICATIONS

This application is related to commonly assigned United States Patent Applications:

"Multibeam Position Ambiguity Resolution", by Keith Olds, Attorney Docket Number IRI03065;

"Position Ambiguity Resolution", by Stanley Attwood, Attorney Docket Number IRI03048;

"Geolocation Responsive Radio Telecommunication System and Method Therefor", by Kristine Maine, Keith Olds, and Gerald Davieau, Attorney Docket Number IRI03052; and "Radio Telecommunications System and Method with Adaptive Convergence Location Determination", by Keith Olds and Kristine Maine, Attorney Docket Number IRI03049;

TECHNICAL FIELD OF THE INVENTION

The present invention relates generally to systems that determine the locations of locatable units. More specifically, the present invention relates to non-coherent communication systems which determine the Doppler and/or propagation delay of signals transmitted between locator and locatable units for use as location parameters.

BACKGROUND OF THE INVENTION

A need exists for a substantially global radio telecommunications system that can provide communication services to substantially any point on or near the surface of the earth. For such a system to achieve widespread acceptance, it should be capable of operating with portable subscriber units. In order for subscriber units to have acceptable portability, they should be capable of low power battery operation, and they should be capable of transmitting and receiving electromagnetic signals through a relatively small antenna.

Such a global radio telecommunications system and other radio telecommunications systems may desire to know the locations of the subscriber units. A radio telecommunications system may then qualify the communication services offered to subscriber units depending upon subscriber unit locations. For example, services may be denied within geopolitical jurisdictions where the system has not received permission to operate from governmental licensing agencies. Moreover, the system may be responsible for billing in connection with the use of communication services, and the rates charged for such services may vary from location to location due to tariffs and the like. Likewise, different portions of the electromagnetic spectrum may be used for communications depending upon where a subscriber unit is located. Accordingly, it would be desirable to configure the system so that the locations of subscriber units may be determined and so that information describing locations may be transmitted to controllers which are responsible for making decisions regarding the granting or denying of communication services, billing rates, and the like.

Many prior art location determination systems are known, such as Global Positioning System (GPS), GLONASS, Loran, and the like. While subscriber units could be configured to incorporate components which take advantage of such location determination systems, these components would substantially increase costs of the subscriber units. Moreover, relying on such known location determination systems could reduce reliability of the radio telecommunications system by introducing reliance upon an external system.

The techniques used by such prior art systems to determine location could potentially be incorporated into a radio telecommunications system, but the introduction of such techniques could seriously degrade communication services. For example, most prior art location systems require the use of two or more transmitters or receivers ("locators") that are located at distant positions and that are capable of transmitting or receiving signals to or from a locatable unit whose location is to be determined. Furthermore, some prior art location systems require the use of coherent transceiver designs.

The requirement for two or more locators to be within view over the entire globe makes this approach economically undesirable. While this requirement might be met by placing satellite locators in high or geosynchronous orbits around the earth, higher orbits place satellites further away from locatable subscriber units on the earth. This larger distance causes the subscriber units to consume excessive power or incorporate massive antennas just to participate in communication services. Moreover, higher orbits require increased spectrum allocation to carry a given amount of communications because the allocated spectrum may be reused less frequently in a given area.

The requirement for a coherent transceiver design is also economically undesirable. Unless satellite locators orbit the earth in very high orbits, such satellite locators move relative to a point on the surface of the earth. Unless locators are substantially motionless relative to locatable units, significant amounts of Doppler are present. This Doppler constantly changes. Likewise, signal propagation delay between the satellites and subscriber units constantly changes. A coherent transceiver design which operates in spite of these extreme and changing signal parameters is undesirably complex and experiences an undesirably low reliability and undesirably high manufacturing and sales costs.

SUMMARY OF THE INVENTION

Accordingly, it is an advantage of the present invention that an improved location system and method is provided.

Another advantage of the present invention is that a location system and method are provided which are compatible with the needs of a communications system.

Another advantage of the present invention is that a location system and method are provided which may be adapted for use by satellite locators in low earth orbits.

Another advantage is that the present invention determines a position of a locatable unit using Doppler and/or propagation duration parameters of electromagnetic signals traveling between a locator unit and the locatable unit.

Another advantage is that the present invention acquires relatively accurate Doppler and/or propagation duration estimates without the use of coherent transceiver designs.

The above and other advantages of the present invention are carried out in one form by a method of locating a locatable unit using a locator unit which moves relative to the locatable unit. The method calls for transmitting a first signal from a first one of the locator and locatable units. This first signal is then received at a second one of the locator and locatable units. The second unit estimates a Doppler component of the received first signal. The second unit then transmits a second signal. This second signal is modulated to convey data which describe the estimated Doppler component of the first signal, The first unit receives this second signal. The first unit then measures a frequency offset between a frequency at which the second signal is received at the first unit and a predetermined frequency. A position for the locatable unit is determined in response to the estimated Doppler component and the frequency offset.

The above and other advantages of the present invention are carried out in another form by a method of operating a locatable unit in connection with a locator unit which moves relative to the locatable unit. The method calls for receiving a first signal at the locatable unit. A duration required for the first signal to propagate between the locator and locatable units is then estimated. A point in time at which a second signal may be transmitted from the locatable unit so that the second signal should arrive at the locator unit at a predetermined point in time is determined. The second signal is transmitted from the locatable unit. The second signal is modulated to convey data which describe the estimated propagation duration of the first signal.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
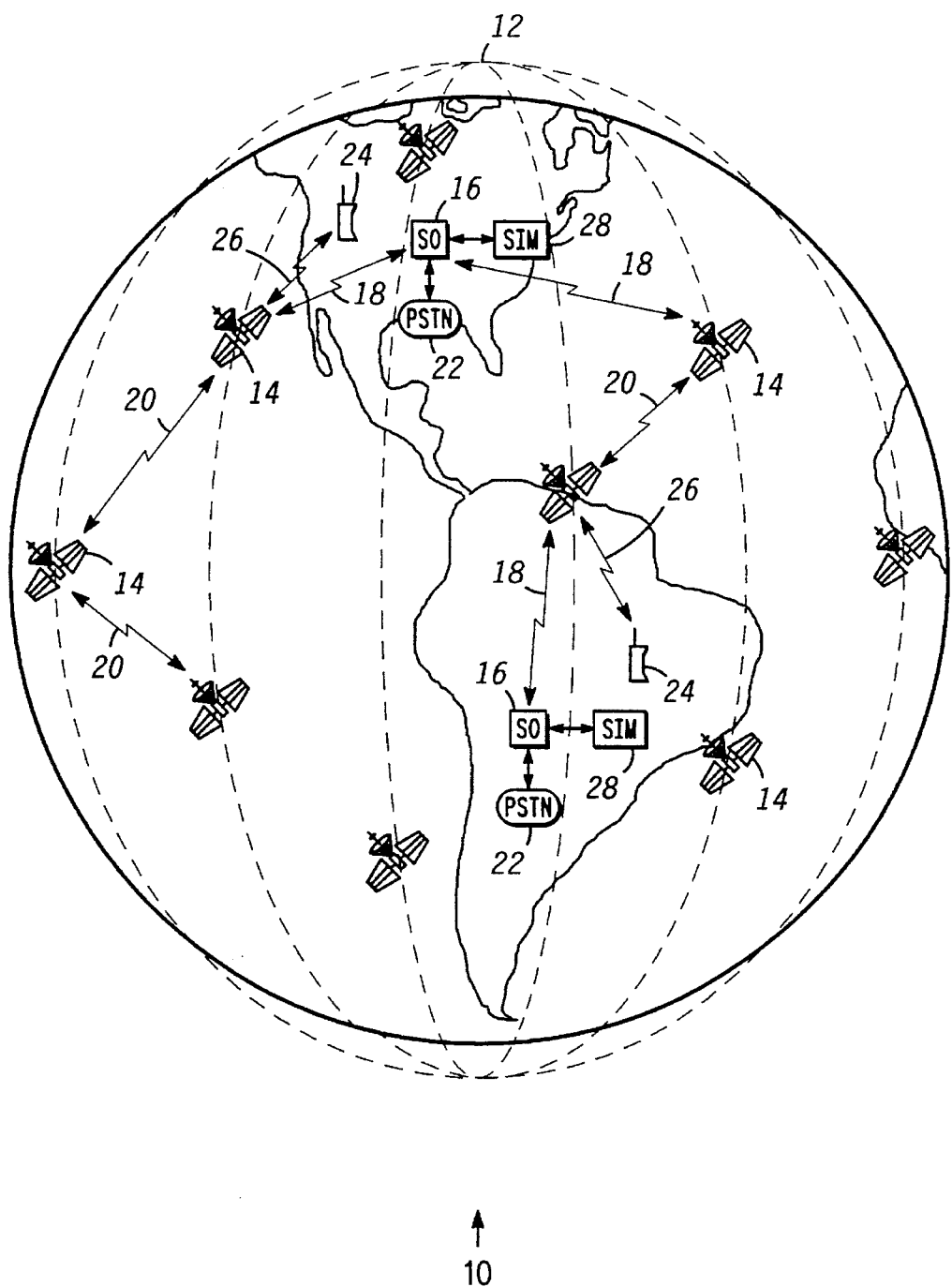
FIG. 1 shows a layout diagram of an environment within which a radio telecommunications system that incorporates a locating system and method may operate.

FIG. 1 shows a layout diagram of an environment within which a radio telecommunications system 10 operates. System 10 includes a constellation 12 consisting of several satellites 14 placed in a relatively low orbit around the earth. Due to the configuration of constellation 12, at least one of satellites 14 is desirably within view of each point on the surface of the earth at all times.

System 10 additionally includes one or more switching offices (SOs) 16. SOs 16 reside on the surface of the earth and are in data communication with nearby ones of satellites 14 through RF communication channels 18. Satellites 14 are also in data communication with one another through data communication channels 20. Hence, through constellation 12 of satellites 14, an SO 16 may control communications delivered to any region of the earth. However, the region controlled by each SO 16 is preferably associated with one or more specific geo-political jurisdictions, such as one or more countries. SOs 16 couple to public switched telecommunication networks (PSTNs) 22, from which calls directed toward subscribers of system 10 may be received and to which calls placed by subscribers of system 10 may be sent.

System 10 also includes any number, potentially in the millions, of locatable subscriber units (SUs) 24. SUs 24 may be configured as conventional portable radio communication equipment. In other words, SUs 24 may be battery powered, may consume relatively low power, and may include relatively small antennas. System 10 accommodates the movement of SUs 24 anywhere on or near the surface of the earth. However, nothing requires SUs 24 to move, and system 10 operates satisfactorily if a portion of the entire population of SUs 24 remains stationary. SUs 24 are configured to engage in communications with satellites 14 over portions of the electromagnetic spectrum that are allocated by governmental agencies associated with various geopolitical jurisdictions. SUs 24 communicate with nearby satellites 14 through communication channels 26.

Any number of subscriber information managers (SIMs) 28 are also included within system 10. Each SIM 28 maintains a subscriber database that is relevant to only a discrete portion of the population of SUs 24. The database may include information describing features associated with SUs 24, rates to be associated with SUs 24, current locations for SUs 24, and other information. Each SU 24 is assigned to one of SIMS 28, and that one SIM 28 is considered the "home" SIM 28 for the SU 24. In the preferred embodiment, an SIM 28 may be associated with each SO 16. In fact, an SIM 28 and an SO 16 may utilize the same computerized hardware. In such an embodiment, an SIM 28 and an SO 16 may be separated logically rather than physically. Each SO 16 may communicate with any SIM 28 through constellation 12, PSTN 22, or internal computer structures when an SO 16 communicates with its logical partner SIM 28.

In general terms, system 10 may be viewed as a network of nodes. Each SU 24, satellite 14, SO 16, and SIM 28 represents a node of system 10. All nodes of system 10 are or may be in data communication with other nodes of system 10 through communication channels 18, 20, and/or 26. In addition, all nodes of system 10 are or may be in data communication with other telephonic devices dispersed throughout the world through PSTNs 22.

Due to the low earth orbits, satellites 14 constantly move relative to the earth. In the preferred embodiments, satellites 14 move in orbits at an altitude in the range of 500–1000 km above the earth. If, for example, satellites 14 are placed in orbits which are around 780 km above the earth, then an overhead satellite 14 travels at a speed of around 25,000 km/hr with respect to a point on the surface of the earth. Electromagnetic signals traveling at or near the speed of light between an SU 24 positioned near the surface of the earth and a satellite 14 in such an orbit will require a propagation duration of 2–3 msec or more, depending on the satellite's angle of view. Moreover, electromagnetic signals traveling between an SU 24 positioned near the surface of the earth and a satellite 14 in such an orbit may experience a considerable Doppler component of frequency shift, the precise value of which is dependent on a source frequency and the satellite's angle of view.

Figure 2:
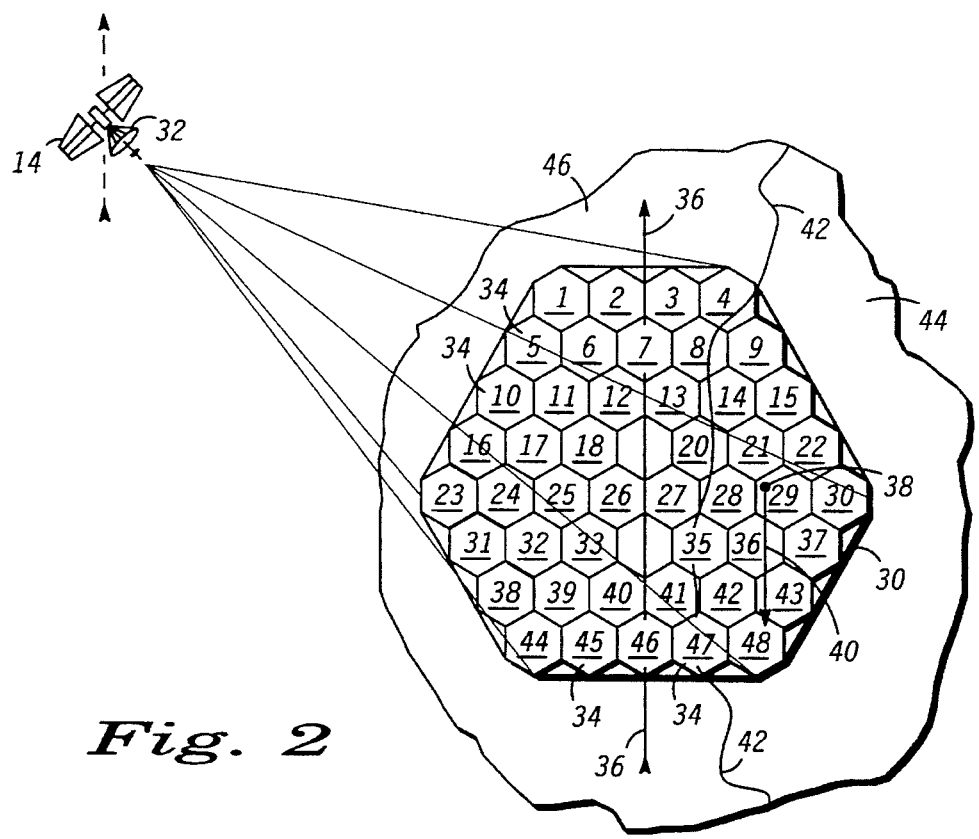
FIG. 2 shows a cellular pattern formed on the surface of the earth by a satellite portion of the radio telecommunications system.

FIG. 2 shows a cellular footprint pattern 30 formed on the surface of the earth by a single satellite 14. Each satellite 14 includes an array 32 of directional antennas. Each array 32 projects numerous discrete antenna patterns on the earth's surface at numerous diverse angles away from its satellite 14. FIG. 2 shows a diagram of a resulting pattern of cells 34 that a satellite 14 forms on the surface of the earth. Other satellites 14 (not shown) form other footprints (not shown) adjacent to the footprint 30 shown in FIG. 2 so that substantially the entire surface of the earth is covered by cells 34.

Each cell 34 within footprint 30 occupies a unique position within footprint 30. These positions are distinguished from one another through the use of a cell ID, listed as 1 through 48 in FIG. 2. For convenience, FIG. 2 illustrates cells 34 as being discrete, generally hexagonal shapes without overlap or gaps. However, those skilled in the art will understand that in actual practice equal strength lines projected from the antennas of satellites 14 may actually have a shape far different than a hexagonal shape, that antenna side lobes may distort the pattern, that some cells 34 may cover larger areas than other cells 34, and that some overlap between adjacent cells may be expected.

System 10 (see FIG. 1) communicates through satellites 14 with SUs 24 (see FIG. 1) using a limited amount of the electromagnetic spectrum. In the preferred embodiment, a combined frequency division multiplex (FDM), time division multiplex (TDM) scheme is employed. In other words, different channels may be assigned to different time slots at a common frequency, and different channels may be assigned to different frequencies at common time slots. Channels are specified or defined by identifying both a frequency and time slot. Each satellite 14 controls the implementation of the FDM/TDM scheme for its communications. SUs 24 conform their operations to the FDM/TDM standards set by satellites 14.

Channels may be grouped together into discrete channel sets. Desirably, each of these discrete channel sets is orthogonal to all other channel sets. In other words, simultaneous communications may take place at a common location over every channel in every channel set without significant interference. As is conventional in cellular communication systems, the channel sets are assigned to cells 34 through a reuse scheme which prevents adjacent cells 34 from using common channel sets. However, common channel sets are reused in spaced apart cells 34 to efficiently utilize the allocated spectrum.

Each satellite 14 is associated with a nadir direction. The nadir direction is defined by an imaginary line (not shown) extending from the satellite 14 toward the center of the earth. For a given satellite 14, a ground point resides where the nadir direction intersects the surface of the earth. As the satellite 14 moves around the earth in its orbit, this ground point forms a satellite ground track 36. As shown in FIG. 2, a first portion of cells 34 in footprint 30 resides to the left of ground track 36 and a second portion of cells 34 in footprint 30 resides to the right of ground track 36.

FIG. 2 shows a point 38, which illustrates an example position for a locatable SU 24 on the surface of the earth at a particular point in time. Of course, those skilled in the art will appreciate that this is merely an example and that any SU 24 may reside at any point on or near the surface of the earth. As satellite 14 moves relative to the earth, footprint 30 and cells 34 likewise move relative to the earth. As a result of this movement, a subscriber unit cell track 40 is formed through cells 34. Those skilled in the art will appreciate that point 38 need not actually move relative to the earth as depicted in FIG. 2. Rather, point 38 moves primarily with respect to cells 34 to form cell track 40.

On the surface of the earth, a boundary 42 separates a first jurisdiction 44 from a second jurisdiction 46. Any number of boundaries 42 may divide the entire earth's surface into any number of different jurisdictions. Boundaries 42 need not represent physical phenomena of the earth. Rather, boundaries 42 represent lines imposed over the geography of the earth to achieve some of the goals of radio telecommunication system 10 (see FIG. 1). Nothing prevents the existence of more than one set of boundaries 42 corresponding to the same sections of the earth. Boundaries 42 may divide the earth into geopolitical jurisdictions, communication service rate jurisdictions, and the like.

Figure 3:
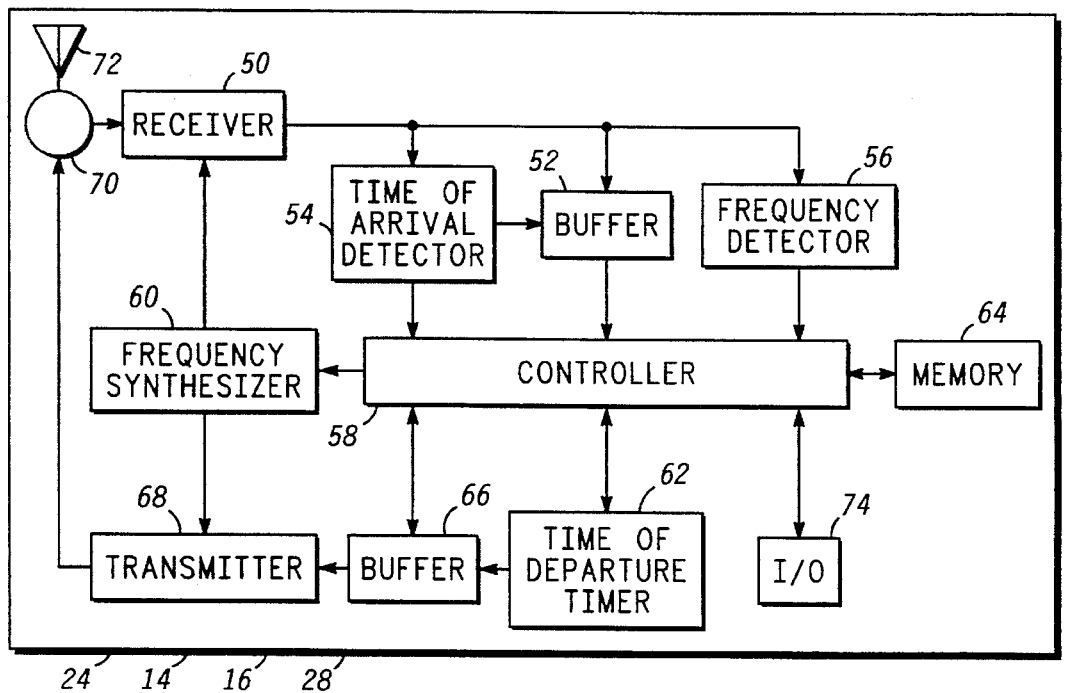
FIG. 3 shows a block diagram of a node of the radio telecommunications system.

FIG. 3 shows a block diagram of any node 48 of radio telecommunications system 10 (see FIG. 1). As discussed above, any SU 24, satellite 14, SO 16, or SIM 28 represents a node of system 10. Node 48 includes one or more receivers 50. Receivers 50 receive signals from communication channels 18, 20, and/or 26 (see FIG. 1). While an SU 24, SO 16, or SIM 28 may include only a single receiver 50, a satellite 14 includes many receivers for simultaneously communicating over numerous different ones of channels 18, 20, and 26 (see FIG. 1). Receivers 50 couple to receive buffers 52, which temporarily store data received at receivers 50 until these data can be processed. Receivers 50 also couple to a time of arrival detector 54 and a frequency detector 56.

Time of arrival detector 54 identifies the point in time when a burst of baseband data are initially received at node 48 or an offset between expected and actual points in time for receiving a burst of data. Detector 54 couples to buffer 52 so that data may be correctly clocked into buffer 52 as they are received. Detector 54 may be implemented in a conventional manner. For example, detector 54 may oversample incoming data and declare a time of arrival to be the point in time where sampled data exhibits a maximum amplitude. Alternatively, detector 54 may correlate input baseband samples with the conjugate of a complex local reference running at a frequency equal to twice the symbol rate. This correlation produces a correction term that describes the phase difference between the input signal and local reference. The phase difference can then be integrated over an entire burst and scaled to provide timing offset measurements.

Frequency detector 56 measures a frequency associated with baseband data. Baseband data may be associated with a residual IF frequency due to Doppler and errors in precisely modulating and demodulating baseband data. Detector 56 may be implemented in a conventional manner. For example, a maximum-likelihood phase estimator, a fast fourier transform (FFT) signal processor, or other form of frequency detection may be used.

Buffer 52, time of arrival detector 54, and frequency detector 56 all couple to a controller 58. Controller 58 also couples to a frequency synthesizer 60 to control receive and transmission frequencies. Synthesizer 60 provides a local oscillator signal to receiver 50. Receiver 50 generates a baseband signal which exhibits a frequency approximately equal to the difference between a received signal and the local oscillator signal. While an SU 24, SO 16, or SIM 28 may include only a single synthesizer 60, a satellite 14 may include many synthesizers controlled by controller 58 to support simultaneous communication over numerous different ones of channels 18, 20, and 26 (see FIG. 1).

Controller 58 additionally couples to a time of departure timer 62, a memory 64, and transmit buffers 66. Controller 58 uses timer 62 to help monitor real time by maintaining the current date and time. In addition, timer 62 helps detect precise points in time for transmitting data from node 48. Transmit buffers 66 are used to temporarily store data placed therein by controller 58. Transmit buffers 66 couple to one or more transmitters 68, and synthesizer(s) 60 provide a local oscillator signal which transmitter(s) 68 use in modulating baseband data to RF. While SUs 24, SOs 16, and SIMs 28 may include only one transmitter 68, satellites 14 desirably include numerous transmitters 68 for simultaneously communicating over numerous different ones of channels 18, 20, and 26 (see FIG. 1). Receiver(s) 50 and transmitter(s) 68 may couple through a signal splitter(s) 70 to antenna(s) 72. Timer 62 couples to transmit buffers 66 to specify when data are to be clocked from buffers 66 for transmission through transmitters 68, signal splitters 70, and antennas 72.

Memory 64 includes data which serve as instructions to controller 58 and which, when executed by controller 58, cause node 48 to carry out processes that are discussed below. In addition, memory 64 includes variables, tables, and databases that are manipulated due to the operation of node 48.

In earth-based nodes 48, controller 58 also couples to an I/O section 74. In an SU 24, I/O section 74 may include microphones, speakers, digitizers, vocoders, decoders, and the like, to convert between audio and digitized packets that are compatible with system 10 (see FIG. 1). Likewise, I/O section 74 may include a keypad for controlling the operation of SU 24 by a user. In an SO 16 or SIM 28, I/O section 74 may include keyboards, displays, magnetic memory devices, printers, and other devices conventionally coupled to computerized equipment. In an SO 16, I/O section 74 may additionally include components for coupling to a PSTN 22 (see FIG. 1).

Each node 48 represents a programmable transceiver which takes on the character assigned to it by software programing located in memory 64 and executed by controller 58. As is discussed below, the present invention configures nodes 48 as locatable unit measurement processors 76 (see FIG. 5), locator unit measurement processors 78 (see FIG. 6), location processors 80 (see FIG. 7), and the like.

Since each node 48 is or may be in data communication with other nodes 48, the precise location and distribution of some of these processors and the tasks they perform are less important considerations. By way of example, the functions of SIMs 28 may be performed on the same hardware which performs the functions of SOs 16, or the functions may be performed on different hardware, such as a satellite 14. In the preferred embodiment, satellites 14 represent locator units, and SUs 24 represent locatable units. Thus, satellites 14 perform the functions of locator unit measurement processors 78 and subscriber units 24 perform the functions of locatable unit measure processors 76 in the preferred embodiment. However, those skilled in the art can adapt the teaching of the present invention to situations where locatable units are represented by satellites or other moving objects while locator units are represented by more stable subscriber or other units. While the differences between processors 66, 68, 70, and 72 may be physical due to their location in different ones of SUs 24, satellites 14, SOs 16, and SIMs 28, any physical differences may be of only minor importance. Rather, the differences between processors 76, 78, and 80 are primarily logical.

Figure 5:
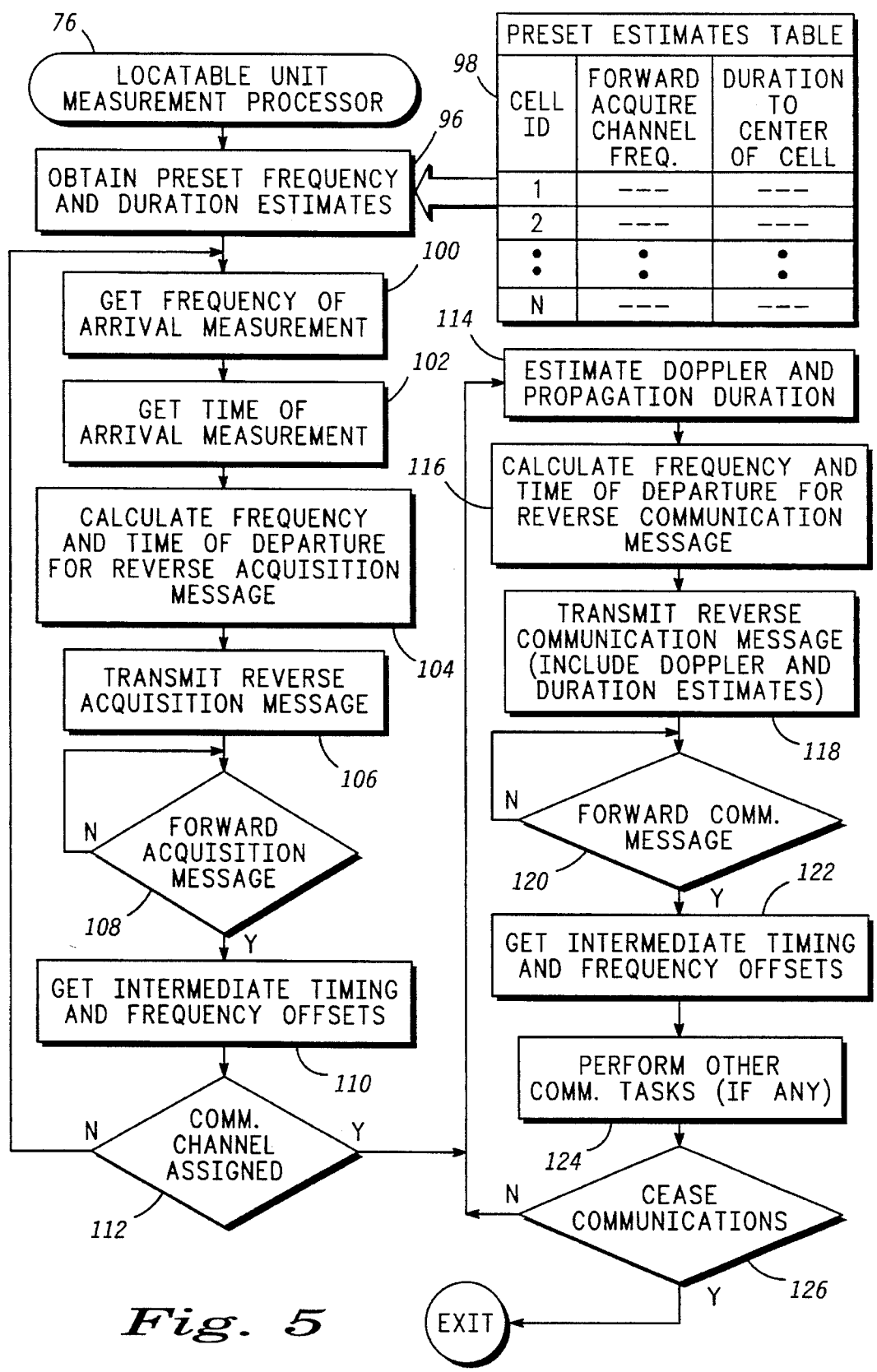
FIG. 5 shows a flow chart of tasks performed by a locatable unit measurement processor portion of the radio telecommunications system.
Figure 6:
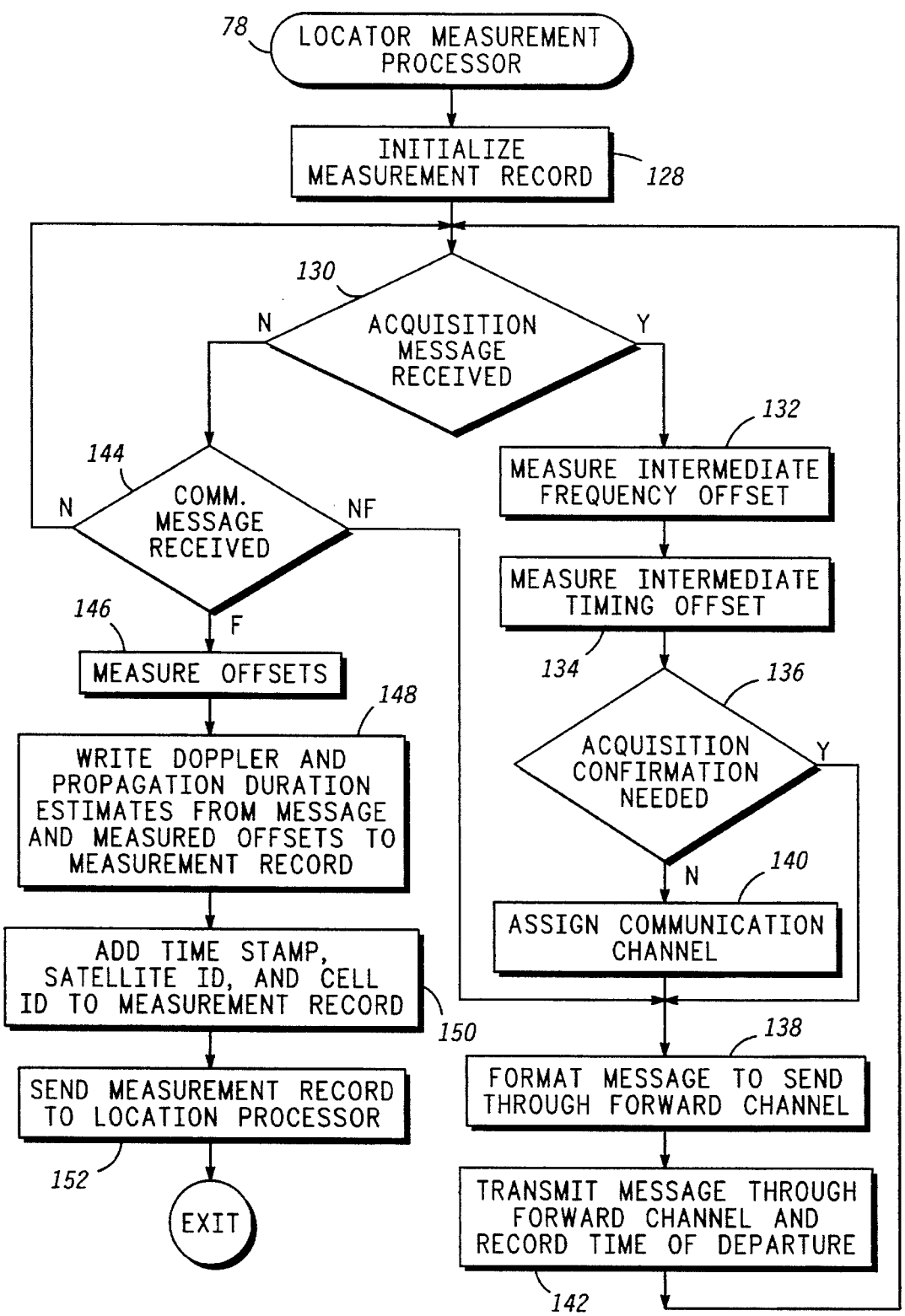
FIG. 6 shows a flow chart of tasks performed by a locator measurement processor portion of the radio telecommunications system.
Figure 7:
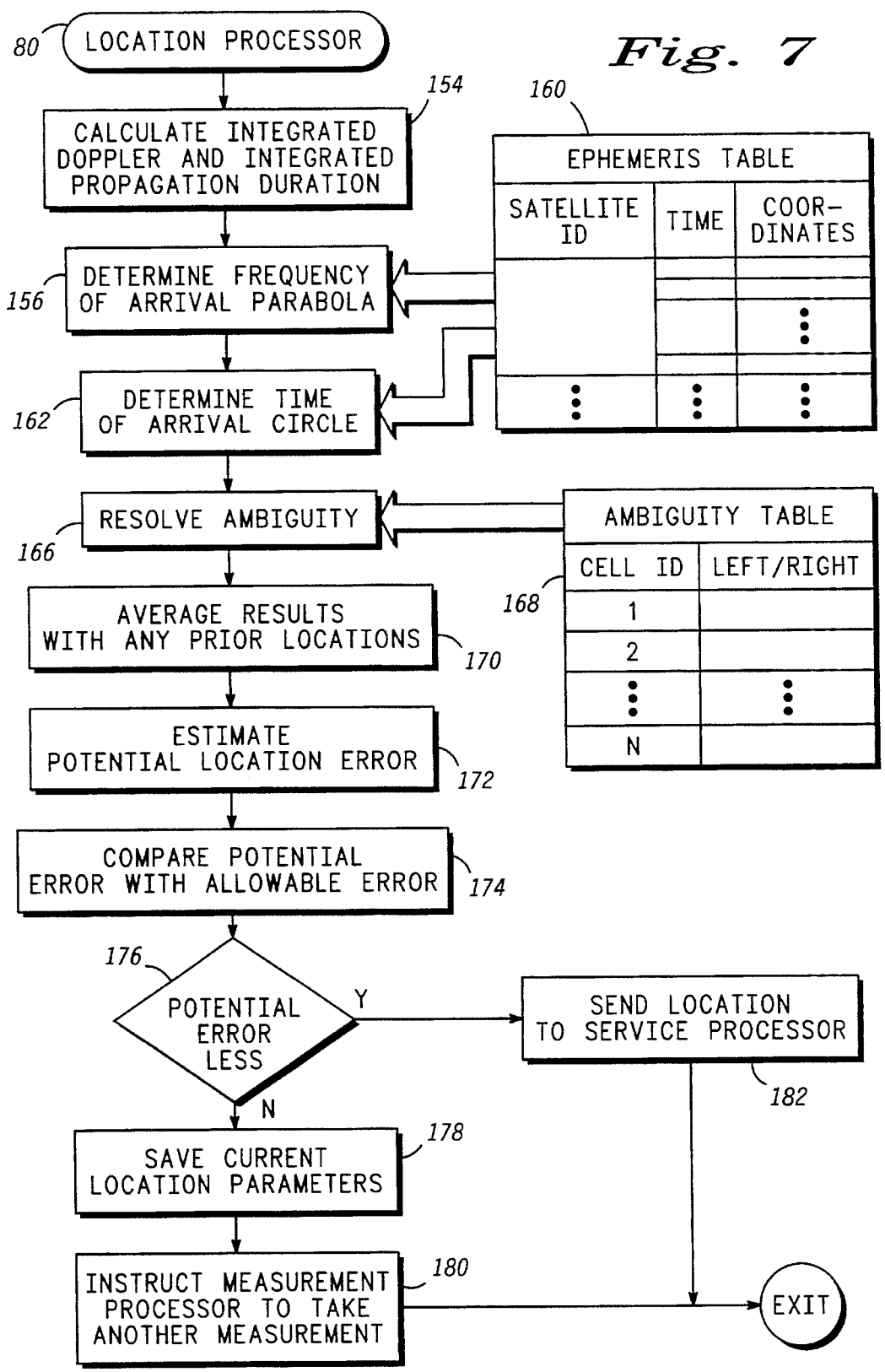
FIG. 7 shows a flow chart of tasks performed by a location processor portion of the radio telecommunications system.

FIGS. 5–6 and 7 (discussed below) depict processors 76, 78, and 80, which are implemented by nodes 48 within radio telecommunication system 10. Those skilled in the art will appreciate that these processors are defined by programing instructions placed in a memory 64 of the node 48 where the processors may be located. Moreover, in the preferred embodiment of the present invention, all SUs 24, satellites 14, SOs 16, and SIMs 28 perform substantially the same processes as other SUs 24, satellites 14, SOs 16, and SIMs 28, respectively. Thus, while the description presented below is directed toward a single locatable unit measurement processor 76, a single locator unit measurement processor 78, and a single locator processor 80, the following description may be viewed as applying to all locatable unit measurement processors, locator unit measurement processors, location processors in system 10.

Figure 4:
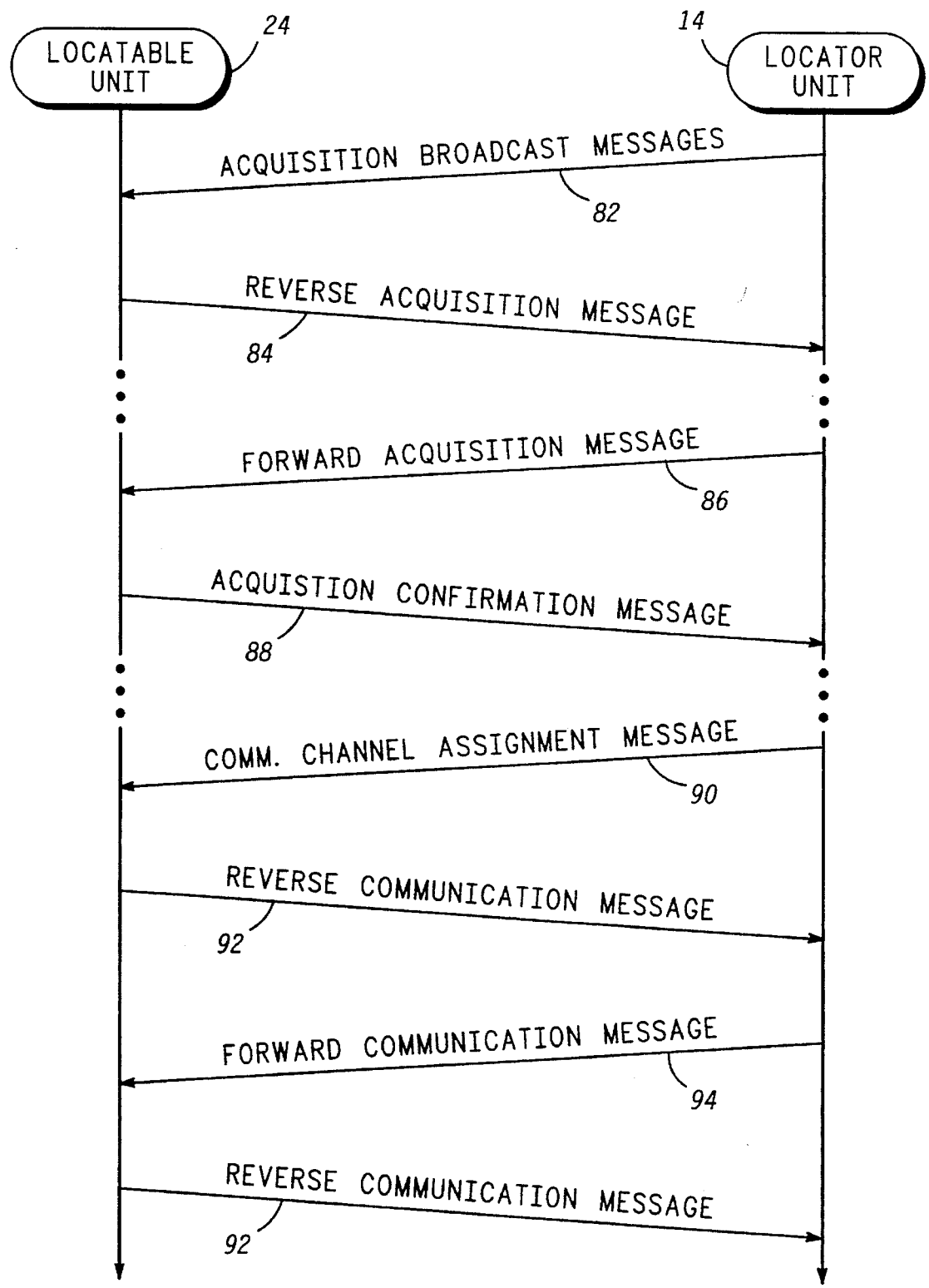
FIG. 4 shows a timing diagram of messages exchanged between a locator unit and a locatable unit.

FIG. 4 shows a timing diagram of messages exchanged between a satellite 14, hereinafter referred to as a locator unit 14, and a SU 24, hereinafter referred to as a locatable unit 24. Through the exchange of the messages depicted in FIG. 4, and the processes discussed below in connection with FIGS. 5–6, system 10 (see FIG. 1) obtains location parameters. These location parameters are then converted into a location, as discussed below in connection with FIGS. 7–8. System 10 then qualifies communication services provided to the locatable unit 24 based on the location. The service qualification may include, for example, allowing or denying services, determining rates for services, and the like.

As discussed above, the preferred embodiment of the present invention contemplates the implementation of a FDM/TDM communication scheme. Locator unit 14 functions as a master in implementing this scheme, while locatable unit 24 has the slave job of conforming its operations to the scheme established by locator unit 14. Locator units 14 move relative to locatable units 24 at a considerable speed and at a considerable distance. Accordingly, electromagnetic signals travelling between locator units 14 and locatable units 24 experience a significant Doppler frequency shift and a significant propagation duration.

In order to aid locatable units 24 to conform their operations to the communication scheme established by a locator unit 14, two types of communication channels are used within the domain of communication link 26 (see FIG. 1). Acquisition channels have a low data rate capacity and are used by locatable units 24 in acquiring a communication link 26 (see FIG. 1). At least one acquisition channel is established for each cell 34 (see FIG. 2) supported by locator unit 14. On the other hand, communication channels have a relatively high data rate capacity and are used to transfer data between a locator unit 14 and a locatable unit 24 once the communication link 26 has been acquired. Preferably, each cell 34 has numerous communication channels. Acquisition channels may tolerate relaxed frequency and timing parameters compared to communication channels.

For purposes of the present invention, each acquisition and communication channel has a forward direction and a reverse direction. The forward direction for messages traveling between locator unit 14 and locatable unit 24 is deemed to be from locator unit 14 to locatable unit 24, and a reverse direction is deemed to be from locatable unit 24 to locator unit 14. These directional notations are assigned arbitrarily and are used only to distinguish one direction from the other. Preferably, a reverse direction of a channel uses the same frequency as a forward direction for the channel, but uses a different time slot. However, this is not a requirement.

Locator units 14 continually repeat transmissions of a broadcast message 82 in the forward direction over an acquisition channel. Message 82 is transmitted at one of a plurality of discrete predetermined frequencies and one of a plurality of discrete points in time from the perspective of locator unit 14. Message 82 is encoded to convey data describing the identity of the locator unit 14 sending message 82, the identity of the cell 34 (see FIG. 2) with which message 82 is associated, and any other data deemed useful by system 10. Preferably, message 82 conveys a relatively small amount of data so that it may be more easily detected by locatable units 24. When locatable units 24 are initially energized, are handed off to new cells 34 (see FIG. 2), initiate calls, or temporarily lose a communication link 26 (see FIG. 1), they monitor the spectrum used by locator unit 14 to detect an acquisition broadcast message 82. Locator unit 14 may transmit several acquisition broadcast messages 82 before locatable unit 24 can successfully receive and demodulate a message 82.

When locatable unit 24 determines rough frequency and timing parameter estimates that allow it to receive message 82, unit 24 roughly estimates frequency and timing parameters that should allow it to successfully transmit a reverse acquisition message 84 to locator unit 14. Message 84 may convey only a small quantity of data, such as a locatable unit ID only, so that locator unit 14 may detect message 84 using relaxed frequency and timing parameters.

When locator unit 14 successfully detects message 84, locator unit 14 and locatable unit 24 exchange forward acquisition messages 86 and acquisition confirmation messages 88 in an iterative process which causes locatable unit 24 to refine its initial rough frequency and timing estimates into accurate frequency and timing parameters. When accurate frequency and timing parameters have been determined, locator unit 14 sends a communication channel assignment message 90 in the forward direction over the acquisition channel, and locatable unit 24 responds with a reverse communication message 92 sent in the reverse direction over the assigned communication channel. Message 92 may convey substantially more data than message 88. Locator unit 14 may successfully detect messages 92 using relatively tight frequency and timing parameters because locatable unit 24 is now using relatively tight frequency and timing parameters in transmitting messages 92. Significant amounts of data may then be exchanged with locator unit 14 transmitting forward communication messages 94 to locatable unit 24 over the assigned communication channel and locatable unit 24 transmitting reverse communication messages 92 over the assigned communication channel.

Once locatable unit 24 acquires message 82, it performs the functions of locatable unit measurement processor 76, a flow chart of which is shown in FIG. 5. Processor 76 causes locatable unit 24 to process messages 84, 86, 88, 90, 92, and 94. Any one of several different events may cause locator unit 14 to perform locator unit measurement processor 78, a flow chart of which is shown in FIG. 6. For example, processor 78 may activate when locator unit 14 receives a reverse acquisition message 84 from a locatable unit 24. Alternatively, processor 78 may activate when location processor 80, discussed below (see FIG. 7), requests its activation. Processor 78 causes locator unit 14 to process messages 84, 86, 88, 90, 92, and 94.

Locatable unit 24 generally has a goal of transmitting a signal to locator unit 14 on a frequency which, after the signal experiences a Doppler shift caused by relative movement between locator and locatable units 14 and 24, causes the signal to be received by locator unit 14 at a predetermined frequency reserved for messages 86 or 92 (see FIG. 4). When forward and reverse directions of a channel use the same frequency, locatable unit 24 causes locator unit 14 to receive the signal at the same frequency used by locator unit 14 in transmitting to locatable unit 24. Generally speaking, locatable unit 24 receives a signal from locator unit 14 at a reference frequency plus a Doppler component, and locatable unit 24 transmits at the reference frequency minus the Doppler component.

Likewise, locatable unit 24 generally has a goal of transmitting a signal to locator unit 14 so that the signal arrives at locator unit 14 at a predetermined point in time after experiencing a propagation delay or duration caused by the distance between the locator and locatable units 14 and 24. The predetermined point in time may occur a predetermined framing duration following the transmission of a corresponding forward direction signal from locator unit 14, as determined by the locator unit's time base. Roughly speaking, locatable unit 24 receives a signal from locator unit 14 at the transmission point in time plus the propagation duration, and locatable unit 24 transmits a signal to locator unit 14 at the transmission point in time, plus the predetermined framing duration, minus the propagation duration.

As shown in FIG. 5, when acquisition broadcast message 82 (see FIG. 4) is detected, processor 76 performs a task 96 to obtain preset frequency and duration estimates. These estimates may be obtained from a preset estimates table 98 maintained in memory 64 (see FIG. 3) of locatable unit 24. In the preferred embodiment, table 98 associates a cell ID with a Doppler frequency that has been calculated to represent the average Doppler experienced throughout the associated cell 34 (see FIG. 2). In addition, table 98 associates cell IDs with signal propagation durations that have been calculated to represent average propagation durations experienced by electromagnetic signals traveling between locator unit 14 and locatable units 24 positioned in the associated cells 34. Thus, task 96 may obtain preset Doppler frequency and propagation duration estimates through a table look up operation using the cell ID detected from message 82.

In an alternate embodiment, message 82 may be configured to include data which describe the average Doppler and/or propagation duration. In this alternate embodiment, task 96 may obtain preset Doppler frequency and/or propagation duration from message 82.

After task 96, processor 76 performs a task 100 to get a frequency of arrival measurement. The frequency of arrival measurement may be obtained from frequency detector 56 (see FIG. 3). Frequency detector 56 provides a baseband, or residual IF, frequency that is related to RF frequency through the frequency programmed into synthesizer 60 (see FIG. 3) when message 82 (see FIG. 4) was received. Next, a task 102 obtains a time of arrival measurement, which may be obtained from time of arrival detector 54 (see FIG. 3).

While locatable unit 24 may have a priori knowledge of the frequency and timing used by locator unit 14 in transmitting message 82 (see FIG. 4), nothing requires a reference frequency or time base used by locatable unit 24 to be synchronized with locator unit 14. Thus, the frequency of arrival measurement obtained in task 100 describes Doppler plus a frequency error term associated with receiving signals. This frequency error term represents the accumulation of RF noise in the received signal, inaccuracies in being able to instruct synthesizer 60 (see FIG. 3) to generate a precise local oscillator frequency, inaccuracies in generating a precise local oscillator frequency from synthesizer 60, inaccuracies in being able to measure frequency at frequency detector 56 (see FIG. 3), and the like.

Likewise, the time of arrival measurement obtained in task 102 describes the point in time at which message 82 was transmitted from locator unit 14, plus the propagation duration, plus a timing error term associated with receiving signals. This timing error term represents the accumulation of noise in the received signal, inaccuracies in being able to precisely determine when message 82 (see FIG. 4) is received, inaccuracies in being able to specify when message 82 is received, and the like. In order to reduce costs, the time base and other components used by locatable units 24, may experience considerable drifts and other offsets. This drift and these offsets may cause the frequency and timing errors to be significant components of the initial measurements taken in tasks 100 and 102.

After task 102, a task 104 calculates a frequency and time of departure for reverse acquisition message 84 (see FIG. 4). For initial rough estimates, processor 76 assumes that the preset estimates obtained in task 96 describe Doppler and duration. Task 104 subtracts the estimated Doppler from the frequency of arrival measurement taken in task 100 to obtain a frequency error estimate. Assuming that message 84 is conveyed by a signal that locator unit 14 should receive at the same frequency upon which locator unit 14 transmitted message 82 (see FIG. 4), the programming to synthesizer 60 (see FIG. 3) is adjusted to compensate for the total frequency error and estimated Doppler. In particular, the transmission frequency is calculated to be the received frequency, plus the frequency error, minus the estimated Doppler. If the reverse direction of the acquisition channel has a different frequency from the forward direction, the transmission frequency calculation is adjusted to reflect the frequency difference.

Task 104 calculates the point in time at which the transmission of message 84 (see FIG. 4) should begin. This point in time equals the time of arrival determined in task 102, plus a predetermined framing duration constant, minus twice the propagation duration estimate obtained in task 96. Task 104 then programs synthesizer 60 (see FIG. 3) and timer 62 (see FIG. 3) in accordance with these calculations, and task 104 formats data to include in message 84. In the preferred embodiment, these data describe an ID for locatable unit 24 and optionally includes a command to be interpreted as a request for access to system 10 (see FIG. 1). When the appropriate time of departure for message 84 occurs, locatable unit 24 performs task 106 to transmit message 84. After the transmission is complete, task 106 may program synthesizer 60 with a reference frequency suitable for receiving a forward acquisition message 86 (see FIG. 4) over the acquisition channel. This reference frequency differs from the transmission frequency by the locatable unit's estimate of the Doppler.

After tasks 104 and 106, processor 76 performs a query task 108. Task 108 determines whether forward acquisition message 86 (see FIG. 4) has been received at locatable unit 24 yet. Message 86 is detected by monitoring the acquisition channel to detect a message addressed to the locatable unit's ID. Task 108 is repeatedly performed until message 86 is received. However, those skilled in the art will appreciate that a timeout may be implemented to cause processor 76 to repeat task 106 or take other actions if locator unit 14 fails to respond with message 86.

When message 86 is detected, a task 110 gets intermediate timing and frequency offsets from the message. The intermediate timing and frequency offsets are described by data conveyed in message 86. These offsets may be obtained from buffer 52 (see FIG. 3). The generation of these offsets is discussed below in connection with FIG. 6. Generally speaking, the frequency offset informs locatable unit 24 of how much the frequency used for the last transmission of message 84 (see FIG. 4) differed from a frequency that would have caused the message 84 signal to exhibit a desired receive frequency, as determined by locator unit 14. The timing offset informs locatable unit 24 of how much the timing used in the last transmission of message 84 differed from timing that would have caused the message 84 to be received at locator unit 14 at a desired time slot, as determined by locator unit 14.

After task 110, a query task 112 determines whether forward acquisition message 86 (see FIG. 4) assigned a communication channel. A communication channel will be assigned by locator unit 14 when locatable unit 24 has demonstrated that its frequency and timing parameters are estimated accurately enough to permit operation over a communication channel. A communication channel requires tightly controlled frequency and timing parameters to permit the transmission of relatively large amounts of data. If message 86 does not assign a communication channel, program control loops back to task 100 to cause locatable unit 24 to calculate parameters for acquisition confirmation message 88 (see FIG. 4) and to transmit message 88. This loop may be performed any number of times causing any number of messages 88 to be sent to locator unit 14.

In subsequent iterations of tasks 100, 102, and 104 in this loop, the frequency offset obtained from message 86 (see FIG. 4) is assumed to describe total error in estimating a transmission frequency. The frequency measured in task 100 is assumed to describe Doppler plus receive error. This measured frequency is treated as the locatable unit's estimate of Doppler. Task 104 adjusts the programming to synthesizer 60 (see FIG. 3) by subtracting the offset frequency from the reference frequency specified for receiving message 86 to correct errors in a reference frequency. In addition, task 104 subtracts the measured frequency obtained in task 100 from the newly compensated reference frequency to obtain a transmit frequency that, when modified by Doppler, will be received at locator unit 14 at close to the desired frequency.

In subsequent iterations of tasks 100, 102, and 104 in this loop, the timing offsets obtained from message 86 (see FIG. 4) are assumed to describe total error in estimating transmission timing for the previous transmission of message 84 or 88 (see FIG. 4). The time of arrival measured in task 102, when adjusted for the predetermined framing delay and compared with the prior time of arrival gives an estimate of propagation duration. In other words, the current time of arrival, minus the predetermined framing delay, minus the previous time of arrival provides the locatable unit's estimate of propagation duration. Of course, those skilled in the art will appreciate that the propagation duration estimate may also be compared to acceptable limits. If the propagation duration estimate is initially greater than allowed by the limits, the estimate may then be reduced by an integral number of predetermined constant framing delays until the estimate is within allowable limits. This flexibility in timing gives locator unit 14 the freedom to choose different frames within which to respond with message 86.

Subsequent iterations of task 104 adjust the programming of departure timer 62 (see FIG. 3) by subtracting the offset timing from a reference time base previously used in calculating a time of departure to correct errors in the time base. In addition, task 104 subtracts the propagation duration estimate derived from the time of arrival measurement obtained in task 102 from the newly compensated reference time base. Task 102 also adds the predetermined framing delay to obtain a new transmit time of departure. The new transmit time of departure, when modified by propagation duration, will cause the message 88 (see FIG. 4) to arrive at locator unit 14 in the desired time slot.

When task 112 detects that a message 90 (see FIG. 4) that conveys data assigning a communication channel to locatable unit 24, a sufficient number of iterations of the loop consisting of tasks 100, 102, 104, 106, 108, and 110 have been performed to wash out constant or slowly drifting errors between the reference frequency and time base used in locatable unit 24 and the corresponding reference frequency and time base in locator unit 14. Errors which remain and are described by the frequency and timing offsets conveyed by message 86 are assumed to describe substantially random errors.

When a communication channel is assigned, a task 114 is performed to again estimate Doppler and propagation duration. Task 114 performs substantially the same tasks as discussed above. In other words, the frequency of arrival measurement obtained from frequency detector 56 (see FIG. 3) provides the locatable unit's estimate of Doppler, and the time of arrival obtained from time of arrival detector 54 (see FIG. 3) is used to calculate the propagation duration. Specifically, the previous time of arrival and an integral number of framing delays are subtracted from the current time of arrival to obtain the locatable unit's estimate of propagation duration.

After task 114, a task 116 calculates a frequency and time of departure for a reverse communication message 92 (see FIG. 4). The calculations of task 116 are substantially the same as those discussed above in connection with task 104. However, the communication channel may be at a different frequency than the acquisition channel used for messages 88 (see FIG. 4). Thus, the Doppler estimate may be scaled to compensate for this frequency difference. Likewise, the time slot definition for the communication channel may be different from the time slot definition for the acquisition channel used for messages 88. The framing delay may be adjusted to compensate for any time slot difference. Task 116 additionally writes a data message to buffer 66 (see FIG. 3), programs synthesizer 60 (see FIG. 3) to operate at the calculated frequency of departure, and programs timer 62 (see FIG. 3) to accommodate the calculated time of departure.

Reverse communication message 92 differs from acquisition confirmation message 88, discussed above. Since a communication channel is available, a greater amount of data may be included in message 92 than was included in messages 88. Thus, message 92 includes data describing the locatable unit's estimates of Doppler and propagation duration, determined above in task 114. After task 116, a task 118 transmits reverse communication message 92 in accordance with the frequency of departure and time of departure calculated in task 116. After the transmission is complete, task 118 may program synthesizer 60 with a reference frequency suitable for receiving a forward communication message 94 (see FIG. 4) over the communication channel. As discussed above, this reference frequency differs from the transmission frequency by the locatable unit's estimate of the Doppler.

After task 118, processor 76 performs a query task 120. Task 120 determines whether forward communication message 94 (see FIG. 4) has been received at locatable unit 24 yet. Task 120 is repeatedly performed until message 94 is received. When message 94 is received, a task 122 obtains intermediate timing and frequency offsets from the message 94. Task 122 operates substantially as task 110, discussed above, except that the offsets now refer to the communication channel rather than the acquisition channel.

After task 122, a process 124 is performed to engage in any other communication tasks which may be required of locatable unit 24 and system 10 (see FIG. 1). Such other tasks may include the decoding of encoded data into an audio format, the detection of commands and the taking of appropriate action in response to the commands, and the like. Such other tasks are not related to the determination of location or location parameters and are not discussed further herein.

After process 124, a query task 126 determines whether to cease communications over the communication channel. Task 126 may decide to cease communications when a command to cease communications has been received in a message 94. Alternatively, task 126 may decide to cease communications when the signal conveying message 94 cannot be detected. So long as task 126 decides to continue communications, program control loops back to task 114. In the preferred embodiment, processor 76 repeats the loop of tasks 114, 116, 118, 120, and 122 for at least one additional iteration. During subsequent iterations, task 116 may not need to compensate for changes in frequency or time slot definitions because previous messages were sent over the same communication channel. Moreover, during subsequent iterations, nothing prevents locatable unit 24 from receiving and acting upon a command which instructs locatable unit 24 to forgo including Doppler and duration estimates in future messages 92 sent to locator unit 14 or to include the estimates in future messages 92 sent to locator unit 14. When task 126 decides to cease communications, program control exits processor 76 and locatable unit 24 may enter a standby mode of operation (not shown).

FIG. 6 shows a flow chart of tasks performed by locator measurement processor 78 of the radio telecommunications system 10. As discussed above, processor 78 may be performed in several different situations, including the receipt of a reverse acquisition message 84 from a locatable unit 24 and the receipt of a command from locator processor 80 (see FIG. 7).

Processor 78 performs a task 128 to initialize a measurement record. This initialization may, for example, include the writing of a locatable unit's ID to the measurement record along with other parameters, such as frequency or channel ID, that describe the communications taking place between locator unit 14 and locatable unit 24.

After task 128, processor 78 performs a query task 130. Task 130 determines whether either a reverse acquisition message 84 (see FIG. 4) or an acquisition confirmation message 88 (see FIG. 4) has been received from locatable unit 24. When an acquisition message 84 or 88 has been received, a task 132 is performed to measure an intermediate frequency offset of the acquisition message signal's frequency. As discussed above, locator unit 14 desires to receive message 84 at a desired reverse acquisition frequency, and task 132 measures any difference in actual and desired frequencies. Task 132 may obtain the frequency offset from frequency detector 56 (see FIG. 3) for the node 48 that serves as locator unit 14.

After task 132, a task 134 measures an intermediate timing offset for the acquisition message. As discussed above, locator unit 14 desires to receive the acquisition message at a time slot with a desired time of arrival, and task 134 measures any offset between the actual and desired time of arrival.

Next, a query task 136 determines whether a confirmation of the acquisition of communication link 26 (see FIG. 1) is needed. Confirmation may be needed whenever locatable unit 24 has not yet demonstrated that it has adequately adjusted its timing and frequency parameters. Task 136 may require the number of messages 84 (see FIG. 4) received from locatable unit 24 to exceed a predetermined number, such as one, and the frequency and timing offsets obtained in tasks 132 and 134 to be less than predetermined limits before deciding that acquisition confirmation is not needed. When task 136 decides that acquisition confirmation is needed, program control proceeds to a task 138. On the other hand, when task 136 decides that acquisition confirmation is not needed, a task 140 is performed, then program control proceeds to task 138.

Task 138 formats a forward acquisition message 86 (see FIG. 4) to send through the acquisition channel. Message 86 includes data describing the locatable unit's ID along with the intermediate frequency and timing offsets obtained above in tasks 132 and 134. When task 140 is performed because acquisition confirmation is not needed, a communication channel is assigned in task 140 and included in the message in task 138. This message then serves as a communication channel assignment message 90 (see FIG. 4). After task 138 and possibly task 140, a task 142 transmits the message 86 or 90 through the acquisition channel and records the time of departure for later use. After task 142, program control loops back to task 130.

When task 130 fails to detect an acquisition message, a query task 144 determines whether a reverse communication message 92 (see FIG. 4) has been received. If no message 92 has been received, program control loops back to task 130 to wait for the receipt of another message from the locatable unit 24. If a message 92 has been received, it may be considered a final (F) message or a non-final message (NF). A non-final message is preferably declared upon the first message 92 received over a newly assigned communication channel. A non-final message will not result in the determination of location parameters that will be used to determine location. By omitting the first message 92, the scaling of Doppler to account for changes in frequency between acquisition channels and communication channels may be omitted. Errors associated with scaling are therefore omitted from the location parameters. When a non-final message 92 is received, program control proceeds to task 138, discussed above. Although not shown in FIG. 6, task 132 and 134 may also be performed to obtain intermediate frequency and timing offsets.

When task 144 encounters a final reverse communication message 92, processor 78 performs a task 146. Task 146 records the time of arrival for the message 92 and measures the frequency and timing offsets, substantially as described above in connection with tasks 132 and 134. After task 146, a task 148 obtains the Doppler and propagation duration estimates from the reverse communication message 92, discussed above in connection with FIG. 5, and writes these estimates to the measurement record initialized above in task 128. In addition, task 148 writes the frequency and timing offsets measured above in task 146 to the measurement record.

After task 148, a task 150 completes the measurement record by adding a time stamp, the satellite's ID, and the ID of the cell 34 (see FIG. 2) within which the measured communications were conducted. The time stamp defines a point in real time at which the communications were taking place between locatable unit 24 and locator unit 14. However, the communications were actually conducted over a duration commencing with the previous performances of tasks 142 and 146. The points in time at which these tasks were performed were recorded. Task 150 preferably averages these points in time to obtain a point in time approximately half way between the transmission of message 94 and the receipt of a final message 92. By averaging these two points in time, errors caused by movement of locatable unit 24 and locator unit 14 over this duration are minimized.

After task 150, a task 152 sends the measurement record to location processor 80 (see FIG. 7) so that location processor 80 may determine the location of locatable unit 24.

In the preferred embodiment, a location processor 80 resides in each SIM 28 (see FIG. 1). The particular SIM 28 which receives the measurement record is the home SIM 28 for the locatable unit 24 whose location is being determined. This particular home SIM 28 may be distinguished from other SIMs 28 through the locatable unit's ID. After task 152, program control exits processor 78, and processor 78 becomes inactive. However, processor 78 may be reactivated at any time with respect to this or another locatable unit 24. Moreover, nothing prevents processor 78 from being configured in a reentrant fashion to simultaneously take measurements for more than one locatable unit 24 at a time.

FIG. 7 shows a flow chart of tasks performed by location processor 80. The preferred embodiment of the present invention implements a location processor 80 in each SIM 28. In particular, the home SIM 28 for a locatable unit 24 implements a location processor 80 for that locatable unit 24. However, those skilled in the art could adapt location processor 80 for implementation in any other node 48 (see FIG. 3) of system 10, or an independent node (not shown) can be established to implement a single location processor 80 for the entire system 10 and all locatable units 24. Radio telecommunications system 10 activates location processor 80 with respect to a specific locatable unit 24 when a measurement record relating to that locatable unit 24 is received at the node 48 within which location processor 80 resides. Generally speaking, location processor 80 translates the data obtained in the measurement record into a location for the locatable unit 24.

In particular, location processor 80 performs a task 154 to calculate integrated Doppler and integrated propagation duration location parameters. As discussed above, the iterative exchange of messages between locatable and locator units 24 and 14 washes out constant, offset, and low frequency errors, leaving substantially random errors. These random errors are characterized by the frequency and timing offsets measured at locator unit 14. However, these offset measurements reflect approximately twice the actual random errors.

Task 154 calculates an integrated Doppler component to equal the estimated Doppler component measured by locatable unit 24 plus one-half of the frequency offset measured by locator unit 14. The integrated Doppler component is responsive to only one-half of the frequency offset because locatable units 24 duplicate errors in detecting Doppler when calculating frequencies upon which to transmit reverse communication messages 92 back to locator unit 14. Thus, the offsets measured by locator unit 14 reflect approximately twice the actual error for the measurement.

Likewise, task 154 calculates an integrated propagation duration to equal the estimated propagation duration measured by locatable unit 24 plus one-half of the timing offset measured by locator unit 14. As with Doppler, timing errors are duplicated in reverse communication messages and timing offset measurements reflect approximately twice actual error.

After task 154, processor 80 performs a task 156 to determine a frequency of arrival curve to fit the integrated Doppler parameter calculated above in task 154. Since locator unit 14 is orbiting the earth and locatable unit 24 is located on or near the earth's surface, the direction with which a locator unit 14 moves with respect to a locatable unit 24 continually changes. Since this direction continually changes but the locator unit's orbital speed remains relatively constant, the component of velocity in a radial direction toward locatable unit 24 continually changes. As a result of the continual velocity change, the Doppler component continually changes relative to a stationary locatable unit 24 near the earth's surface. On the other hand, a given Doppler component could be reported from any point located on a hyperbolic shape geographically centered about satellite ground track 36 (see FIG. 2) and extending away from the locator unit 14.

Figure 8:
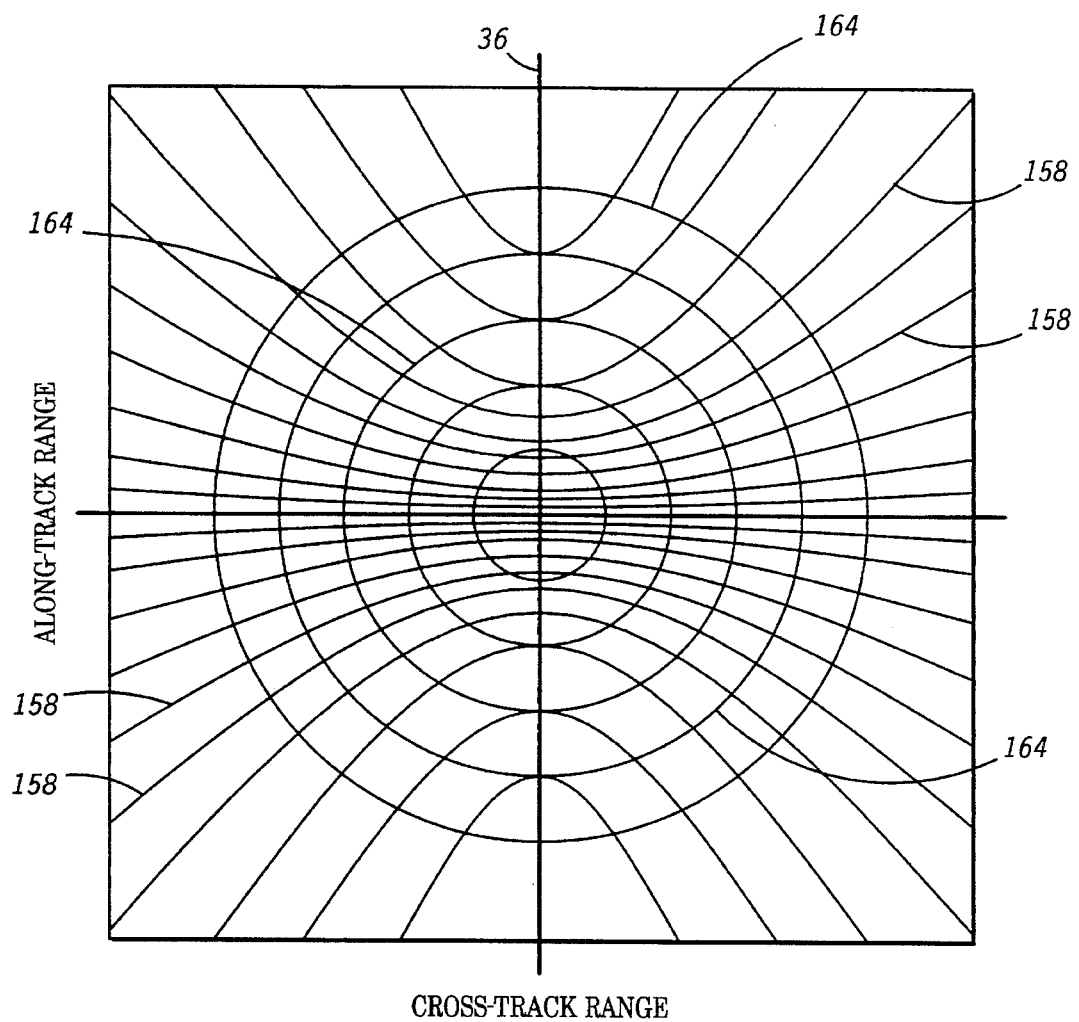
FIG. 8 graphically depicts constant Doppler and constant propagation duration curves which illustrate location determination in the radio telecommunications system.

FIG. 8 graphically depicts constant Doppler curves 158. As shown in FIG. 8, a given integrated Doppler parameter may be graphically plotted on the surface of the earth as a hyperbola centered along satellite ground track 36 and extending away from a locator unit 14. Higher Doppler rates result in thinner hyperbolas 158. At zero Doppler, which occurs when a locator unit 14 is directly overhead a locatable unit 24, the Doppler curve has an infinite width and resembles a straight line perpendicular to satellite ground track 36. The frequency of arrival curve determined in task 156 (see FIG. 7) represents the curve 158 that describes the integrated Doppler parameter calculated in task 154 (see FIG. 7).

Those skilled in the art will appreciate that the actual measured Doppler will characterize movement of locatable unit 24 as well as movement of locator unit 14. Radio telecommunications system 10 allows locatable units 24 to move. However, due to the low earth orbits of locator units 14, locator units 14 move at a much greater speed than is possible for locatable units 24 located on or near the earth. Consequently, the speed or movement of locatable units 24 may be ignored for the purposes of this discussion.

Moreover, those skilled in the art will appreciate that a constant Doppler curve in three-dimensional space is actually a hollow, hyperbolid (three-dimensional hyperbola). With reference back to FIG. 7, the results of task 154 do not describe the perimeter of this hyperbolid but the two-dimensional intersection of this three-dimensional hyperbola on the surface of the earth. For convenience, the constant Doppler curves 158 shown in FIG. 8 ignore the minor distortion in shape caused by the curvature and rotation of the earth.

Furthermore, task 156 translates the Doppler frequency curve from coordinates which are centered upon the locator unit or the locator unit's nadir direction into earth coordinates. Since locator unit 14 travels in a predictable orbit, this translation may take place by consulting an ephemeris table 160, a block diagram of which is illustrated in FIG. 7. Ephemeris table 160 may be retained in memory 64 (see FIG. 3) of the node 48 (see FIG. 3) which implements location processor 80. Table 160 assigns earth coordinates for locator units 14 as a function of time. By using satellite ID, time stamp data from the measurement record, and orbital geometry for locator unit 14, task 156 may assign the Doppler frequency curve earth coordinates.

While the preferred embodiment of the present invention directly uses the above-discussed integrated Doppler parameter, those skilled in the art will appreciate that Doppler may be used indirectly to identify other location curves. For example, those skilled in the art will appreciate that the above-described orbital geometry produces a Doppler component which changes in time. Nothing prevents detecting Doppler change and fitting curves to Doppler change rather than to direct Doppler. Those skilled in the art will understand that the term Doppler as used herein is intended to encompass all such indirect usages of Doppler as well as direct usage of Doppler.

After task 156 determines the Doppler frequency curve on the surface of the earth, a task 162 determines a propagation delay curve or circle which fits the integrated propagation duration calculated above in task 154. Since electromagnetic signals propagate through the atmosphere at a substantially constant velocity of approximately the speed of light, a given propagation duration dictates that the source of a signal responsible for the propagation duration must reside on the surface of a sphere having a radius approximately equal to the propagation duration times the speed of light and centered at the point where the signal is received. Those skilled in the art will appreciate that substantially the same propagation duration results for forward and reverse direction messages. Thus, with respect to reverse direction messages, the source of an electromagnetic signal is a locatable unit 24 residing on or near the surface of the earth. The signal is received at a locator unit 14 orbiting the earth. A propagation delay circle represents the intersection of a hollow sphere with the earth's surface. This sphere is centered at locator unit 14 and has a radius equal to the integrated propagation duration times the speed of light.

FIG. 8 graphically depicts constant propagation delay circles 164. As shown in FIG. 8, a given propagation duration may be graphically plotted on the surface of the earth as a circle centered at the point on satellite ground track 36 where the satellite's nadir direction intersects the surface of the earth. Longer propagation durations result in circles having larger radii. The propagation delay circle determined in task 162 (see FIG. 7) represents the circle 164 that describes the integrated propagation duration calculated in task 154 (see FIG. 7). Referring back to FIG. 7, task 162 may consult ephemeris table 160 to convert the propagation delay circle from satellite-based coordinates into earth-based coordinates.

Referring to FIG. 8, the intersection of a specific Doppler frequency curve 158 with a specific propagation delay circle 164 provides a two-position solution to the location determination problem. One of these two positions resides to the right of satellite ground track 36 and the other resides to the left of satellite ground track 36. The two-position solution is ambiguous because only one of these two solutions is correct.

Referring back to FIG. 7, after tasks 156 and 162 have determined specific Doppler frequency and propagation delay curves, a task 166 resolves the ambiguity presented by the two-position solution. As shown in FIG. 2, each of cells 34 projected by locator unit 14 has a unique ID associated with it. In addition, a first portion of these cells 34 resides to the right of ground track 36 and a second portion of these cells 34 resides to the left of ground track 36. Task 166 may consult an ambiguity table 168, a block diagram of which is shown in FIG. 7, to resolve this ambiguity. Table 168 is constructed to associate left-of-ground-track and right-of-ground-track status indications with each cell 34 included in a footprint 30 (see FIG. 2). Table 168 may be stored in memory 64 (see FIG. 3) of the node 48 (see FIG. 3) within which location processor 80 resides. Using the cell ID data included in the measurement record, task 166 can look up a left/right status indication in table 168. With this status indication, task 166 selects one of the two positions and rejects the other. At this point in the process, location processor 80 has determined a location for locatable unit 24.

However, the accuracy of the location determined at task 166 may not be sufficient. Many factors may contribute to inaccuracies. Some of the most prominent factors relate to the nature of Doppler frequency and propagation delay curves 158 and 164, shown in FIG. 8. Referring to FIG. 8, at locations where Doppler frequency curves 158 intersect propagation delay circles 164 at nearly right angles, small errors in Doppler component or propagation duration measurements result in small geographic location errors. These locations are found further away from the point where the satellite's nadir direction intersects the surface of the earth, particularly to the left and right of the satellite's ground track 36. The more tangential the Doppler frequency curves are to an intersecting propagation delay circle, the greater the geolocation error which results from small measurement errors. Moreover, the error is typically greater in a direction perpendicular to satellite ground track 36 than in a direction parallel to satellite ground track 36.

Referring back to FIG. 7, location processor 80 may make more than one location determination for any locatable unit 24 before concluding that sufficient accuracy has been achieved. Additional location determinations are performed through additional activations of locator unit measurement processor 78 (see FIG. 6). Thus, location processor 80 may perform a task 170 to average the location results obtained above in task 166 with any prior results. Of course, those skilled in the art will appreciate that such averaging may alternatively take place above in tasks 154, 156, 162, and 166 as well. The averaging of results from additional iterations of the location process causes the location accuracy to improve. In addition, the random errors typically associated with location parameters may be statistically estimated with probability density functions having standard deviations, and a weighted least mean squares estimator may be used to average results from multiple location determinations.

After task 170, a task 172 estimates potential location error associated with the location determined so far by location processor 80. This potential location error is a function of the determined location relative to locator unit 14. The estimated potential error resembles an ellipse (not shown) that is centered at this location. At positions where error is minimal, the ellipse is more circular and covers a relatively small area. At positions where error is greater, the ellipse's area increases and its shape becomes more flattened with a major axis extending perpendicular to the satellite's ground track.

After task 172, a task 174 compares the potential location error with a predetermined allowable error. The allowable error is determined by system constraints. The allowable error resembles a circle (not shown) centered at the determined location and having a radius of a predetermined distance. Task 174 compares the area of the potential error ellipse with the area of the allowable error circle. This comparison may be achieved by comparing the radius of the allowable error with the major axis of the error ellipse.

After task 174, a query task 176 determines whether the potential location error is less than the allowable error. The potential error is less if a predetermined percentage of the area of the potential error ellipse fits within the allowable error circle. While tasks 172, 174, and 176 describe one technique for causing error associated with location determination to converge to an acceptable level, other curve fitting and statistical techniques known to those skilled in the art may be applied as well.

If the potential location error is not less than the allowable error, a task 178 saves the current location parameters for averaging with measurements from a future iteration of location processor 80 with respect to the locatable unit 24. After task 178, a task 180 sends a message to locator unit measurement processor 78 (see FIG. 6) to instruct it to take another measurement. After task 180, program control exits location processor 80, and location processor 80 becomes temporarily inactive with respect to the locatable unit 24 and this location determination. However, when the next measurement record is received for the locatable unit 24 at the node 48 where location processor 80 resides, location processor 80 reactivates.

When task 176 determines that the potential location error is less than the allowable error, a task 182 sends the location to a service processor (not shown), in a location-determined message. At this point, this location determination is complete, and program control exits. Location processor 80 again becomes inactive. However, location processor 80 reactivates for other location determinations, whether for this or other locatable units 24.

The service processor (not shown) that receives the location-determined message qualifies service offered to locatable unit 24 by system 10. In particular, based on the determined location, the service processor may allow or deny service, set service rates, and perform other processes which might be responsive to the location of locatable units 24. In qualifying service, the service processor may compare the location to maps which describe various jurisdictions imposed on the earth by system 10.

In summary, the present invention provides an improved location system and method. The location system and method of the present invention are compatible with the needs of a communications system. For example, satellites orbiting the earth in low-earth orbits serve as locators and as nodes in a communications system. Furthermore, no additional hardware components are required for location determination than are required for communication services. A position of a locatable unit is determined using Doppler and/or propagation duration parameters of electromagnetic signals traveling between the locator unit and the locatable unit. Relatively accurate Doppler and/or propagation duration estimates are acquired without the use of coherent or other expensive transceiver designs. Accuracy is due, at least in part, to frequency and timing measurements made at both locatable units and locator units.

The present invention has been described above with reference to preferred embodiments. However, those skilled in the art will recognize that changes and modifications may be made in these preferred embodiments without departing from the scope of the present invention. For example, the error terms, Doppler components, and offsets discussed above may take on either positive or negative values. Consequently, these items may be either added to or subtracted from reference frequencies, time bases, and the like depending upon system definitions. Moreover, offsets may be halved or doubled as needed to compensate for the doubling of errors that occurs in round trip communications. Moreover, those skilled in the art will appreciate that the flow charts presented herein are intended to teach the present invention and that different techniques for implementing program flow that do not necessarily lend themselves to flowcharting may be devised. In particular, each task discussed herein may be interrupted to permit program flow to perform background or other tasks. In addition, the specific order of tasks may be changed, and the specific techniques used to implement the tasks may differ from system to system. These and other changes and modifications which are obvious to those skilled in the art are intended to be included within the scope of the present invention.

What is claimed is:

1. A method of locating a locatable unit using a locator unit which moves relative to said locatable unit, said method comprising the steps of:

transmitting a first signal from a first one of said locator and locatable units;

receiving said first signal at a second one of said locator and locatable units;

estimating, at said second unit, a Doppler component of said received first signal, said step using a preset frequency from a preset estimate table as adjusted by subsequent signals from said first one of said locator and locatable units to said second one of said locator and locatable units, said preset frequency being an approximation of propagation characteristics of said first signal;

transmitting a second signal from said second unit, said second signal being modulated to convey data which describe said estimated Doppler component of said first signal;

receiving said second signal at said first unit;

measuring, at said first unit, a frequency offset between a frequency at which said second signal is received at said first unit and a predetermined frequency, said predetermined frequency being reserved for transmission of said second signal; and determining a position for said locatable unit in response to said estimated Doppler component received at said first unit as transmitted in said second signal and said frequency offset as measured in said measuring step, said estimated Doppler component and said frequency offset defining a curve whereon said position is located.

2. A method of locating a locatable unit as claimed in claim 1 additionally comprising the step of determining a frequency at which said second signal may be transmitted from said second unit so that said second signal will exhibit said predetermined frequency when received at said first unit.

3. A method of locating a locatable unit as claimed in claim 1 wherein:

said estimating step additionally estimates a propagation duration using a preset duration from said preset estimate table as adjusted by subsequent signals from said first one of said locator and locatable units to said second one of said locator and locatable units, said preset duration being an approximation of propagation characteristics required for said first signal to propagate between said first and second units;

said transmitting a second signal step comprises the step of modulating said second signal to additionally convey data which describe said estimated propagation duration of said first signal;

said measuring step comprises the step of identifying a timing offset between a point in time at which said second signal is received at said first unit and a predetermined point in time, said predetermined point in time being defined by a framing duration of said first unit; and said determining step is configured to determine said position for said locatable unit in response to said estimated propagation duration and said timing offset.

4. A method of locating a locatable unit as claimed in claim 1 wherein said determining step comprises the step of obtaining an integrated Doppler parameter, said integrated Doppler parameter being approximately said estimated Doppler component plus one-half of said frequency offset.

5. A method of locating a locatable unit as claimed in claim 1 wherein said determining step comprises the step of obtaining data describing a time at which said estimated Doppler component and said frequency offset are valid, said data being configured to define said time as occurring between said transmitting a first signal step and said receiving a second signal step.

6. A method of locating a locatable unit as claimed in claim 5 wherein said determining step comprises the step of configuring said data to define said time as occurring approximately half way between said transmitting a first signal step and said receiving a second signal step.

7. A method of locating a locatable unit as claimed in claim 1 additionally comprising the step of causing said locator unit to move in an orbit around the earth.

8. A method of locating a locatable unit as claimed in claim 1 wherein said method additionally comprises, prior to said transmitting said first signal step, the steps of:

estimating, at said second unit, an acquisition Doppler component;

transmitting, from said second unit, a third signal at a frequency responsive to said acquisition Doppler component, said second unit initiating said method of locating by transmitting said third signal prior to transmission of said first signal; and measuring, at said first unit, an intermediate frequency offset between a frequency at which said third signal is received at said first unit and a predetermined reverse acquisition frequency.

9. A method of locating a locatable unit as claimed in claim 8 wherein:

said transmitting said first signal step comprises the step of encoding said first signal to convey data describing said intermediate frequency offset;

said receiving said first signal step comprises the step of obtaining data describing said intermediate frequency offset from said first signal; and said first signal Doppler estimating step comprises the step of defining said estimated Doppler component to be the difference between a predetermined forward communication frequency and said received frequency, compensated by said intermediate frequency offset.

10. A method of operating a locatable unit in connection with a locator unit which moves relative to said locatable unit, said method comprising the steps of:

receiving a first signal at said locatable unit;

estimating a Doppler component of said first signal, said step using a preset frequency from a preset estimate table as adjusted by subsequent signals from said first one of said locator and locatable units to said second one of said locator and locatable units, said preset frequency being an approximation of propagation characteristics of said first signal;

determining a frequency at which a second signal may be transmitted from said locatable unit so that said second signal will exhibit a predetermined frequency when received at said locator unit, said predetermined frequency being reserved for transmission of said second signal; and transmitting said second signal from said locatable unit, said second signal being modulated to convey data which describe said estimated Doppler component of said first signal.

11. A method of operating a locatable unit as claimed in claim 10 wherein:

said estimating step additionally estimates a propagation duration using a preset duration from said preset estimate table as adjusted by subsequent signals from said first one of said locator and locatable units to said second one of said locator and locatable units, said preset duration being an approximation of propagation characteristics required for said first signal to propagate between said locator and locatable units; and said transmitting step comprises the step of modulating said second signal to additionally convey data which describe said estimated propagation duration of said first signal.

12. A method of operating a locatable unit as claimed in claim 10 wherein said estimating step comprises the steps of:

obtaining data describing a reference frequency at which said first signal was transmitted; and determining a difference between said reference frequency and a frequency at which said first signal is received during said receiving step.

13. A method of operating a locatable unit as claimed in claim 10 wherein:

said method additionally comprises, prior to said receiving step, the step of estimating an acquisition Doppler component;

said method additionally comprises the step of transmitting at a frequency responsive to said acquisition Doppler component, said second unit initiating said method of locating by transmitting said third signal prior to transmission of said first signal;

said receiving a first signal step comprises the step of obtaining data from said first signal, said data describing a frequency offset; and said first signal Doppler estimating step comprises the step of defining said estimated Doppler component to be the difference between said predetermined frequency and said received frequency, compensated by said frequency offset.

14. A method of locating a locatable unit using a locator unit which resides a distance away from said locatable unit, said method comprising the steps of:

transmitting a first signal from a first one of said locator and locatable units;

receiving said first signal at a second one of said locator and locatable units;

estimating, at said second unit, a propagation duration using a preset duration from said preset estimate table as adjusted by subsequent signals from said first one of said locator and locatable units to said second one of said locator and locatable units, said preset duration being an approximation of propagation characteristics required for said first signal to propagate between said first and second units;

transmitting a second signal from said second unit, said second signal being modulated to convey data which describe said estimated propagation duration of said first signal;

receiving said second signal at said first unit;

measuring, at said first unit, a timing offset between a point in time at which said second signal is received at said first unit and a predetermined point in time; and determining a position for said locatable unit in response to said estimated propagation duration, received at said first unit as transmitted in said second signal and said timing offset as measured in said measuring step, said estimated propagation duration and said timing offset defining a propagation delay curve whereon said position is located.

15. A method of locating a locatable unit as claimed in claim 14 wherein said determining step comprises the step of obtaining an integrated propagation duration parameter, said integrated propagation duration parameter being approximately said estimated propagation duration plus one-half of said timing offset.

16. A method of locating a locatable unit as claimed in claim 14 wherein said determining step comprises the step of obtaining data describing a time at which said estimated propagation duration and said timing offset are valid, said data being configured to define said time as occurring between said transmitting a first signal step and said receiving a second signal step.

17. A method of locating a locatable unit as claimed in claim 16 wherein said determining step comprises the step of configuring said data to define said time as occurring approximately half way between said transmitting a first signal step and said receiving said second signal step.

18. A method of locating a locatable unit as claimed in claim 14 additionally comprising the step of causing said locator unit to move in an orbit around the earth.

19. A method of locating a locatable unit as claimed in claim 14 wherein said method additionally comprises, prior to said transmitting said first signal step, the steps of:

estimating, at said second unit, an acquisition propagation duration using said preset duration from said preset estimate table as adjusted by subsequent signals from said first one of said locator and locatable units to said second one of said locator and locatable units, said preset duration being an approximation of propagation characteristics required for an acquisition signal to propagate between said first and second units;

transmitting, from said second unit, a third signal at a point in time which is responsive to said estimated acquisition signal duration, said second unit initiating said method of locating by transmitting said third signal prior to transmission of said first signal; and measuring, at said first unit, an intermediate timing offset between a point in time at which said third signal is received at said first unit and a predetermined acquisition point in time.

20. A method of locating a locatable unit as claimed in claim 19 wherein:

said transmitting said first signal step comprises the step of encoding said first signal to convey data describing said intermediate timing offset;

said receiving said first signal step comprises the step of obtaining data describing said intermediate timing offset from said first signal; and said estimating step comprises the step of defining said estimated duration to be said acquisition signal duration, compensated by said intermediate timing offset.

21. A method of operating a locatable unit in connection with a locator unit which moves relative to said locatable unit, said method comprising the steps of:

receiving a first signal at said locatable unit;

estimating a propagation duration using a preset duration from a preset estimate table as adjusted by subsequent signals from said first one of said locator and locatable units to said second one of said locator and locatable units, said preset duration being an approximation of propagation characteristics required for said first signal to propagate between said locator and locatable units;

determining a point in time at which a second signal may be transmitted from said locatable unit so that said second signal should arrive at said locator unit at a predetermined point in time; and transmitting said second signal from said locatable unit, said second signal being modulated to convey data which describe said estimated propagation duration of said first signal.

22. A method of operating a locatable unit as claimed in claim 21 wherein:

said method additionally comprises, prior to said receiving step, the step of estimating a duration required for an acquisition signal to propagate between said locator and locatable units;

said method additionally comprises the step of transmitting a third signal at a point in time which is responsive to said acquisition signal propagation duration, said second unit initiating said method of locating by transmitting said third signal prior to transmission of said first signal;

said receiving a first signal step comprises the step of obtaining data describing an intermediate timing offset from said first signal; and said first signal duration estimating step comprises the step of defining said estimated duration to be said acquisition signal propagation duration, compensated by said intermediate timing offset.

23. A method of operating a radio telecommunications system having at least one satellite moving in an orbit around the earth and having at least one subscriber unit located proximate the earth's surface, said method comprising the steps of:

transmitting a first signal from said satellite;

receiving said first signal at said subscriber unit;

estimating, at said subscriber unit, a Doppler component of said received first signal and a propagation duration required for said first signal to propagate between said satellite and said subscriber unit;

transmitting a second signal from said subscriber unit, said second signal being modulated to convey data which describe said estimated Doppler component of said first signal and to convey data which describe said propagation duration;

receiving said second signal at said satellite;

measuring, at said satellite, a frequency offset between a frequency at which said second signal is received at said satellite and a predetermined frequency, and a timing offset between a point in time at which said second signal is received at said satellite and a predetermined point in time; and determining a location of said subscriber unit relative to the earth in response to said estimated Doppler component, said estimated propagation duration, said frequency offset, and said timing offset, said estimated Doppler component and said frequency offset defining a curve whereon said location is located and said estimated propagation duration and said timing offset defining a propagation delay curve whereon said location is located.

24. A method of operating a radio telecommunications system as claimed in claim 23 additionally comprising the steps of:

determining a frequency at which said second signal may be transmitted from said subscriber unit so that said second signal will substantially exhibit said predetermined frequency when received at said satellite; and determining a point in time at which said second signal may be transmitted from said subscriber unit so that said second signal will arrive at said satellite substantially at said predetermined point in time.

25. A method of operating a radio telecommunications system as claimed in claim 23 wherein said determining step comprises the steps of:

obtaining an integrated propagation duration parameter, said integrated propagation duration parameter being approximately equivalent to said estimated propagation duration plus one-half of said timing offset; and obtaining an integrated Doppler parameter, said integrated Doppler parameter being approximately equivalent to said estimated Doppler component plus one-half of said frequency offset.

26. A method of operating a radio telecommunications system as claimed in claim 25 wherein said determining step comprises the step of obtaining data describing a time at which said propagation duration parameter and said Doppler parameter are valid, said data being configured to define said time as occurring approximately half way between said transmitting a first signal step and said receiving said second signal step.

\* \* \* \* \*